Figure 1:
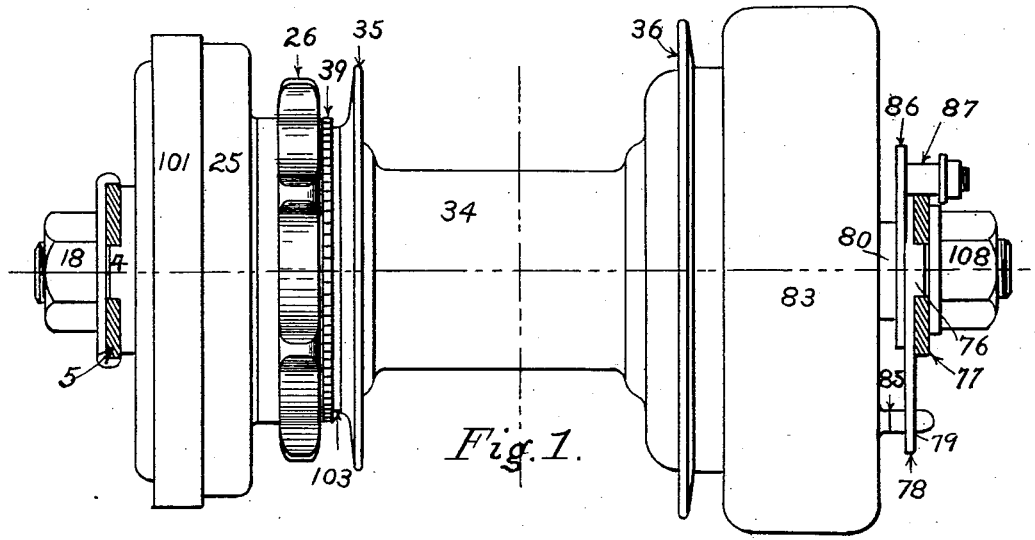

(No Model.) 3 Sheets—Sheet 1.

W. T. HARDER.
VARIABLE SPEED GEARING FOR VELOCIPEDES.

No. 564,616. Patented July 28, 1896.

Witnesses
Nathaniel W. Boyd
James N. Eckels

Inventor
William T. Harder.

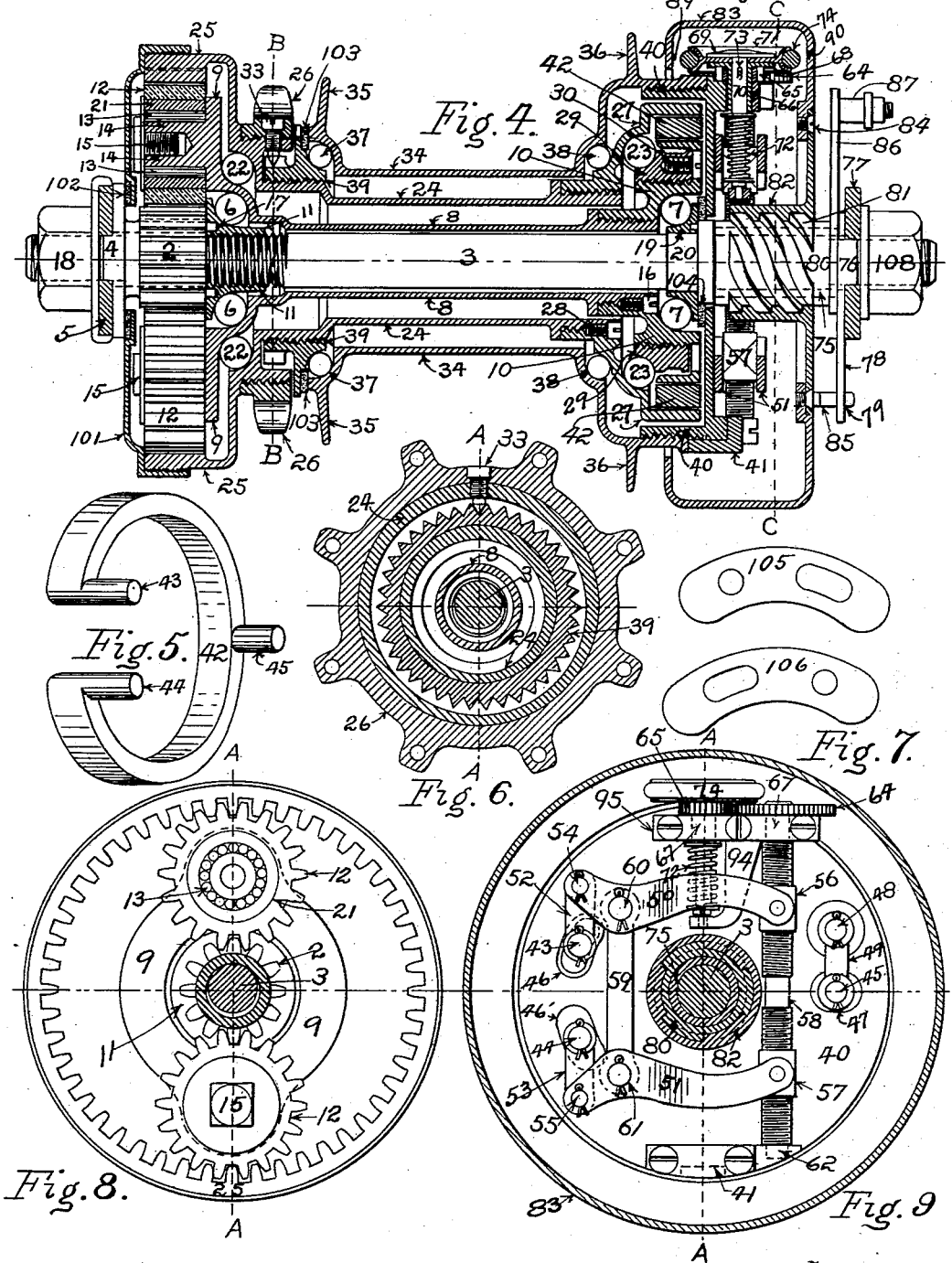

(No Model.) 3 Sheets—Sheet 3.
W. T. HARDER.
VARIABLE SPEED GEARING FOR VELOCIPEDES.
No. 564,616. Patented July 28, 1896.
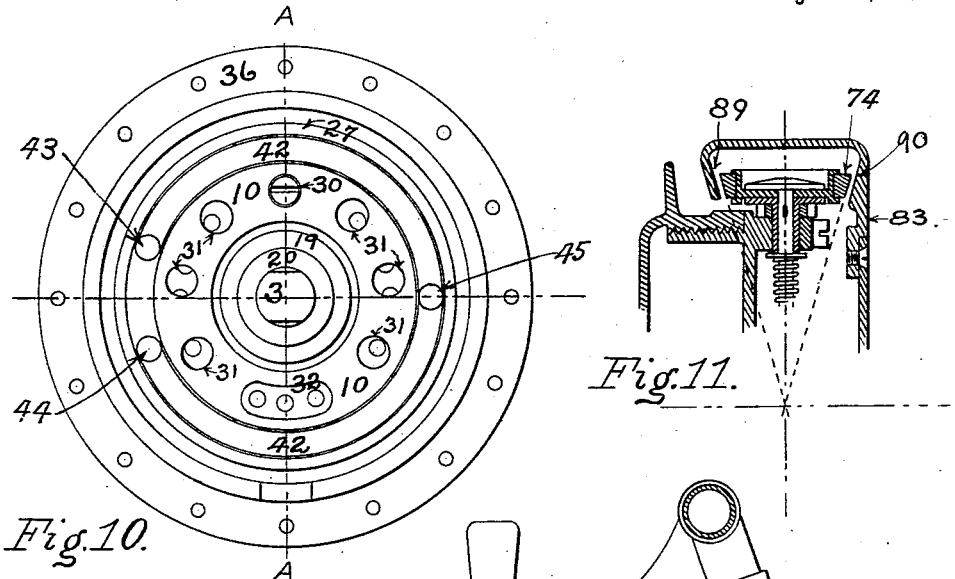
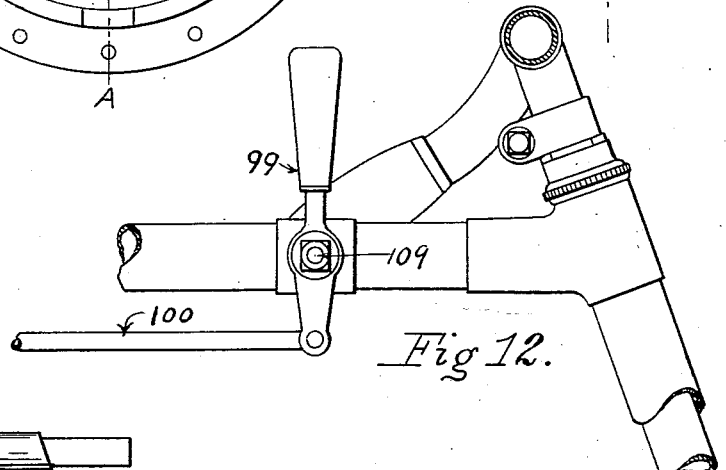
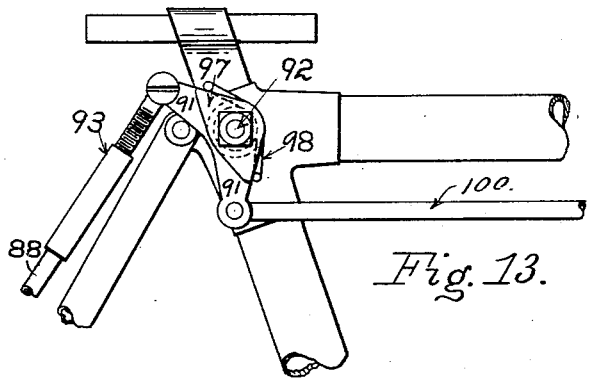
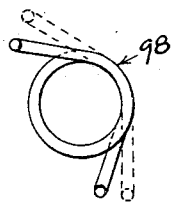
Witnesses
Nathaniel N. Boyd
James W. Eckett
Inventor
William T. Harder

UNITED STATES PATENT OFFICE.

WILLIAM TRUAX HARDER, OF CARLISLE, PENNSYLVANIA.

VARIABLE-SPEED GEARING FOR VELOCIPEDES.

SPECIFICATION forming part of Letters Patent No. 564,616, dated July 28, 1896.

Application filed June 29, 1895. Serial No. 554,500. (No model.)

*To all whom it may concern:*

Be it known that I, WILLIAM TRUAX HARDER, a citizen of the United States, residing at Carlisle, in the county of Cumberland and State of Pennsylvania, have invented certain new and useful Improvements in Variable-Speed Gearing for Velocipedes; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to variable-speed gearing for velocipedes. Its object is to afford the operator a choice of two rates of speed and a correlative advantage of a gain in power of propulsion when desired, at the sacrifice of a certain proportion of speed.

A further object of my device is to permit the available changes in velocity to be made with perfect convenience while machine and rider move onward at any rate, the modified combinations of the parts being perfected gradually, without shock, and within an adjustable limit of frictional stress borne by the clutching mechanism.
My invention relates particularly to that class of speed-varying mechanisms for velocipedes which employ an epicyclic train of gearing. The engagement in and release of the gearing from actual service I accomplish by means of a frictional clutch of novel and original construction deriving its operation from the energy stored in the moving machine and demanding from the rider but a minimum of strength and attention.
My invention consists, further, in so regulating the pressure between surfaces in frictional contact as to positively guard the coacting parts against an excess of power being either accidentally or carelessly thrown thereupon.

The working of my device does not depend upon gearing thrown in and out of mesh to vary the conditions of speed and power, nor upon the chance catching of a sleeve-clutch, both methods being in common use and both objectionable by reason of the impact or jar inseparable from the engagement of such constructions upon a rapidly-moving machine, which mischief is overcome by my improvements.

The elements of my invention are compactly assembled within a dust-proof oiltight casing. Ample and continuous lubrication has been kept in mind, and every part has been designed with a view to simplicity of construction, strength, durability, and cheapness, as indicated by observation and experience with machines of this character. Advantage may obviously be taken of selected material specially adapted to individual parts of my device, and use made of known means of mitigating hurtful friction where necessary.

The following description and explanation of the construction and operation of my invention will enable any person familiar with machinery to reproduce it.

Figure 2:
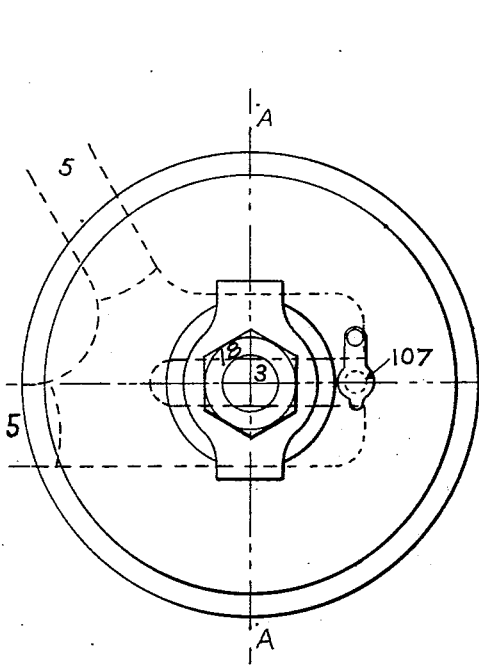
Figure 3:
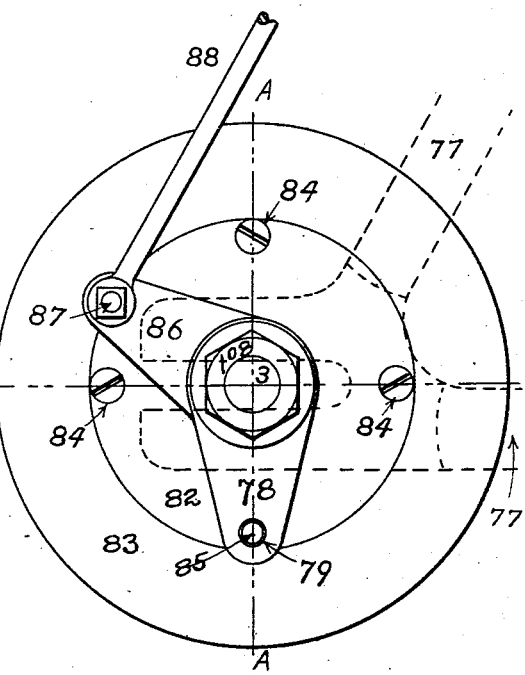

Referring to the accompanying drawings, wherein like numerals are employed to represent like parts, Figure 1 is a side view of my invention, taken from the rear end of a bicycle; Fig. 2, an end view from the right-hand side, and Fig. 3 an end view from the left-hand side, of the first figure. Fig. 4 represents principally a vertical section on a plane containing the diameters and the common axis of the cylinders; Fig. 5, an isometric view of the interrupted and studded ring-clutch; Fig. 6, a vertical section through the sprocket-wheel on line B B of Fig. 4; Fig. 7, plans of the plates for preventing the escape of oil through certain slots in the cover; Fig. 8, a left-hand end view of Fig. 1, the cap being removed to show the epicycloidal gearing; Fig. 9, a vertical section on the line C C of Fig. 4; Fig. 10, a view showing the ring-clutch in position and orifices through which the internal parts may be reached; Fig. 11, a modification of the form of the bowl and frictional gearing shown in Fig. 4 in like section; Fig. 12, a side view of the hand-lever near the steering-head; Fig. 13, a side view of bell-crank upon seat-post lug, with forward and rearward links, the latter adjustable; and Fig. 14, a side view of the spring used to govern the bell-crank.

The pinion 2 is mounted on the axle 3 and is prevented from turning by the lug 4, which fits in the jaws of the rear fork 5. (See Figs.

1, 2, and 4.) As ordinarily constructed, ball-bearings 6 and 7 support the revoluble cylinder 8, which expands at one end into a face-plate 9, and to the opposite end is secured the circular piece 10, having a peripheral surface presented to the ring-clutch. The interior thread of the cone 11 engages the thread upon the axle 3, and a number of apertures in the face of the cone are provided, into one of which a projection from the pinion 2 enters, thus locking the cone 11 in position. Exteriorly the cone 11 forms part of the raceway for the balls 6. The gears 12, of which there may be two, three, or four, as found desirable, rotate upon roller-bearings 13 about the pins 14, projecting from the face-plate 9, and set-screws 15, carrying washers, retain the gears in place. The screw 16 is inserted to prevent separation in action of piece 10 and cylinder 8. The pin 17 projects from the pinion 2 to lock the cone 11, as previously set forth. The axle-nut 18 may be used to exert a desired pressure upon the parts from the left-hand side, Fig. 4. The cone 19 is pinned fast to the collar 20, both parts encircling the axle 3, said collar being fixed thereupon. The elements lastly described appear most clearly in Fig. 4. The gears 12 may possess a steel bushing 21 or consist entirely of steel, Fig. 8. As usually constructed, ball-bearings 22 and 23 support the revoluble cylinder 24, of larger diameter and surrounding the cylinder 8. The cylinder 24 expands at one end into the cup-shaped portion possessing the inner circumferential teeth 25. The sprocket-wheel 26 is threaded upon the cylinder 24 and fastened with soft solder. The cup-shaped piece 27 is provided with a cylindrical surface presented to the ring-clutch, and said piece is firmly attached to one end of the cylinder 24, being held thereupon by the set-screw 28. The cone 29 is threaded upon the piece 10 and secured by screw 30. The said cone forms an adjustable portion of the raceway for the balls 23. Through either of the apertures 31 in piece 10 the screw 30 may be inserted into threaded orifices in the cone 29 when the parts have been relatively adjusted.

It will be seen in Figs. 4 and 10 that the head of screw 30 occupies one of the orifices 31 through piece 10, thereby holding said piece and cone 29 in one of their several available adjustments. The piece 10 is fixed to sleeve 8 by screw 16, as already explained.

Through the slot 32 the cone 29 may be reached and operated, with the adjustment of the bearings 22 and 23 as the result. The screw 33 fastens the sprocket-wheel 26 to a collar hereinafter described. The hub 34, having opposite flanges 35 and 36, to which the spokes are attached, is revoluble upon the ball-bearings 37 and 38 and surrounds the cylinders 8 and 24, previously described. The collar 39, provided with a notched periphery to receive the screw 33 and an interior thread to engage the cylinder 24, forms an adjustable portion of the raceway for the balls 37, while the balls 38 are supported by the piece 27. The cap or cover 40 closes one end of the hub 34, and is kept in place by the keeper 41. (See Figs. 4 and 9.)

The form of the interrupted ring-clutch and the position of the studs thereupon are distinctly set out in Fig. 5. I do not limit myself to an elastic ring of any material, as it is plainly within the scope of my invention to construct the ring in sections connected together. The three studs 43, 44, and 45 represent the ordinary number and position of these projections. When the parts are properly assembled, the said studs pass through slots 46 and 47 in the cap 40. The stud 45 after passing through slot 47 is connected with the stud 48, firmly secured to cap 40, and the link 49 pivotally joins the said studs. The said link allows the ring-clutch 42 to adjust itself closely to either of the presented surfaces of the parts 10 and 27. The short ends of the levers 50 and 51, Fig. 9, are pivotally connected by links 52 and 53 and the pins 54 and 55 to the studs 43 and 44, respectively. The ends of the long arms of the said levers are pivotally attached to the nuts 56 and 57, which traverse their given divisions of the screw 58. The fulcrums of the said levers are pivotally connected to the link 59 by means of the pins 60 and 61. The bearings 62 and 63 support the ends of the screw 58. The gear-wheel 64 terminates the said screw at its upper end and meshes with the gear-wheel 65, fixed upon the hollow spindle 66, revoluble in bearings 67. (See Figs. 4 and 9.) The hollow spindle has a disk-head 68, between which and the disk-head 69, terminating the spindle 70, is the friction-wheel 71. A coiled spring 72 surrounds the spindle 70, and its office is the maintenance of a certain pressure by the disks 68 and 69 upon the upper and lower surfaces of the wheel 71. The pin 73, projecting from the interior of the hollow spindle 66, occupies and travels a longitudinal slot in the spindle 70, and the two spindles are thereby compelled to rotate together. The friction-ring 74 is fixed upon the grooved periphery of the wheel 71. The sleeve 75 upon the axle is prevented from turning by the lug 76, which fits into the jaws of the rear fork 77. (See Figs. 1 and 4.) The arm 78 projects from the sleeve 75, and near the extremity of the arm is an orifice 79. (See Fig. 3.) An additional sleeve 80 is placed upon the stationary sleeve 75, Figs. 4 and 9, and upon the outer surface of sleeve 80 helical threads 81 are formed and engage corresponding threads in one portion 82 of a bowl-shaped casing completed by the second portion 83. (See Figs. 1 and 4.) The two parts of the bowl are held together by screws 84 or equivalents, and the construction is adapted to facilitate the assembling and removal of the various connected elements. A pin 85, occupying the orifice 79, Figs. 3 and 4, prevents the rotation of the bowl, while permitting it to make limited excursions back and forth along the axle 3. By means of the arm 86, carrying the pin 87, connected by the rod 88 to the hand-lever, a partial turn may be given the sleeve 80, and it will be readily seen that the interior faces 89 and 90 of the bowl can thus alternately be brought into contact with the friction-ring 74, Fig. 4.

The bell-crank 91, pivoted on the stud 92 upon the seat-post, operates the mechanism already described through the rod and adjustable connection 93, Fig. 13. The bracket 94 affords a bearing for the lower end of the spindle 70, Figs. 4 and 9, previously mentioned. A washer 97, of rhomboidal shape, is fastened to the stud 92 and furnishes bases for the reaction of the legs of the spring 98, the office of which is to maintain the bell-crank in its middle or normal position. The hand-lever 99 is pivotally connected by the rod 100 to the bell-crank, Figs. 12 and 13. The cap 101 is threaded upon the outer surface of the part bearing the interior teeth 25, and it is provided with a centrally-located annular depression for reception of a ring of packing 102, held in place by the extension of the pinion 2, governed by the axle-nut 18. A second ring of packing 103 is placed between hub 34 and the adjustable collar 39, and a third ring of packing 104 is placed between the cone 19 and the cap 40. Sliding plates 105 and 106, against the cap 40, close the slots through the said piece 40, and the entire interior of the device is rendered dust-proof and oil-tight. The chambers may be partly filled with oil through the aperture 107, which is supplied with a spring-closure. The right-hand axle-nut 108 compresses the rear fork 77 and exerts pressure through the stationary sleeve 75 upon the collar 20.

Number 109 in Fig. 12 represents the pivot of the hand-lever.

The preferred arrangement of the parts may be seen and the operation readily understood by reference to Fig. 4. Through the hand-lever and connections the interior of the bowl is pressed against the friction-ring 74. It will be now understood by those familiar with analogous machinery that no matter how strongly the bowl and ring are pressed together a certain amount only of the driving force is effective. Beyond a set maximum, determined by the tension of the spring 72, confined between collars attached to spindles 66 and 70, the friction-wheel 71 rotates idly. No hurtful strain can therefore be thrown upon the mechanism.

Let the ring-clutch 42 be expanded until the required contact with the piece 27 is attained. The hand-lever is now released and the spring 98 returns the bell-crank, bowl, and attachments to the middle position, and the bowl rides the axle without wear or friction. The contact between the clutching-surfaces remains intact and the hub is driven by the sprocket-wheel through the parts 24, 27, 42, 49, and 40. While moving at any speed let the hand-lever be operated in a direction contrary to that resulting in the combination just described. An opposite series of mechanical actions follows. The pressure between parts 27 and 42 is gradually released and as gradually transferred to the parts 42 and 10, between which an equal pressure is established. The gears 12 12, which in the first instance rotated idly, now have the work thrown upon them, and the power from the sprocket-wheel reaches the hub through the annular gear 25, gears 12, parts 9, 8, 10, 42, 49, and 40, resulting in a decreased number of rotations, while the power to turn the driving-wheel is correspondingly increased.

The modification in the form of bowl, friction-ring, and wheel will appear sufficiently plain upon inspecting Fig. 11. Frictional contact between the said parts, while preferable, is not absolutely essential, as regular gearing could be employed.

Although describing the device as applied to bicycles, I do not wish to be understood as limiting its application thereto, as it is equally adapted to analogous mechanical motive constructions and may be applied thereto without affecting the scope and purview of my invention.

I am aware that the employment of gears, as shown in Fig. 8 and described herein is not new, and that feature of the invention is not broadly claimed.

What I do claim is—

1. In devices for varying the speed of velocipedes, the combination of a frame, a non-revoluble shaft fixed to the frame, a hollow casing provided interiorly with annular engaging-surfaces upon opposite sides and a centrally-located tubular portion adapted to encompass the shaft, attachments joining said casing and frame by which the former is held against rotation but allowed a limited movement to and fro along the shaft, suitable devices arranged to reciprocate said casing, a lever pivoted to said frame, and connections whereby said reciprocating devices may be actuated positively in either direction by said lever while the velocipede is in motion, substantially as set forth.

2. In variable-speed gearing for velocipedes, the combination of a frame, a non-revoluble shaft fixed to said frame, a casing provided interiorly with annular engaging-surfaces upon opposite sides, said shaft passing centrally through and supporting said casing, attachments between said casing and frame by which the former is held against rotation but allowed a limited movement to and fro along the shaft, suitable devices for reciprocating said casing, a lever pivoted to said frame, connections whereby said reciprocating devices may be actuated positively in either direction by said lever, a hollow, revoluble hub, a shaft journaled radially in bearings attached to said hub, a wheel attached to said radial shaft and having a periphery arranged to become engaged by said opposite annular surfaces of the casing alternately, an interrupted ring-clutch capable of being expanded and contracted, lever-connected mechanism adapted to be energized by said radial shaft and to positively operate said ring-clutch, a revoluble driving-cylinder constructed and arranged to be engaged by said ring-clutch and having an enlarged portion provided with an interior annular rack, a pinion fixed upon the non-revoluble shaft, and a revoluble cylinder constructed and arranged to be engaged by said ring-clutch and having a face-plate provided with gearing capable of meshing with said annular rack and fixed pinion, substantially as set forth.

3. In variable-speed gearing for velocipedes, the combination of a frame, a non-revoluble shaft fixed to said frame, a casing provided interiorly with annular engaging-surfaces upon opposite sides, said shaft passing centrally through and supporting said casing, attachments between said casing and frame by which the former is held against rotation but allowed a limited movement to and fro along the shaft, suitable devices for reciprocating said casing, a lever pivoted to said frame, connections whereby said reciprocating devices may be actuated positively in either direction by said lever, a hollow, revoluble hub, a shaft journaled radially in bearings attached to said hub, a wheel having a peripheral engaging-surface, mechanism arranged to drive the radial shaft through limited frictional contact with the said wheel, an interrupted ring-clutch capable of being expanded and contracted, lever-connected mechanism adapted to be energized by said radial shaft and to positively operate said ring-clutch, a revoluble driving-cylinder constructed and arranged to be engaged by said ring-clutch and having an enlarged portion provided with an interior annular rack, a pinion fixed upon the non-revoluble shaft, and a revoluble cylinder constructed and arranged to be engaged by said ring-clutch and having a face-plate provided with gearing capable of meshing with said annular rack and fixed pinion, substantially as set forth.

4. In variable-speed gearing for velocipedes, the combination of a frame, a non-revoluble shaft fixed to said frame, a casing provided interiorly with annular engaging-surfaces upon opposite sides and a central portion having an interior thread, attachments between said casing and frame by which the former is held against rotation but allowed a limited movement to and fro along the shaft, a sleeve provided with an exterior thread corresponding to the interior thread of said casing, a lever pivoted to said frame, connections whereby said sleeve may be partly rotated in either direction by said lever, a spring so arranged as to return said lever and connections from an outer to a normal intermediate position, a hollow, revoluble hub, a shaft journaled radially in bearings attached to said hub and provided with a flat head, a flanged sleeve attached to said radial shaft and adapted to be moved longitudinally thereupon, a wheel having a peripheral engaging-surface and a central orifice for the passage of said radial shaft, means for yieldingly clamping the sides of said wheel between said flat head of the shaft and said flanged sleeve, an interrupted ring-clutch, lever-connected mechanism adapted to be energized by said radial shaft and to positively expand and contract said ring-clutch, a revoluble driving-cylinder constructed and arranged to be engaged by said ring-clutch and having an enlarged portion provided with an interior annular rack, a pinion fixed upon the non-revoluble shaft, and a revoluble cylinder constructed and arranged to be engaged by said ring-clutch and having a face-plate provided with gearing capable of meshing with said annular rack and fixed pinion, substantially as set forth.

5. In variable-speed gearing for velocipedes, the combination of a frame, a non-revoluble shaft fixed to said frame, a casing provided interiorly with annular engaging-surfaces upon opposite sides and a central portion having an interior thread, attachments between said casing and frame by which the former is held against rotation but allowed a limited movement to and fro along the shaft, a sleeve provided with an exterior thread corresponding to the interior thread of said casing, a lever pivoted to said frame, connections whereby said sleeve may be partly rotated in either direction by said lever, a spring so arranged as to return said lever and connections from an outer to a normal intermediate position, a hollow, revoluble hub, a detachable cover closing one end of said hub and having suitable orifices, a shaft journaled radially in bearings attached to said cover and provided with a flat head, a flanged sleeve attached to said radial shaft and adapted to be moved longitudinally thereupon, a wheel having a peripheral engaging-surface and a central orifice for the passage of said radial shaft, means for yieldingly clamping the sides of said wheel between said flat head of the shaft and said flanged sleeve, an interrupted ring-clutch having lateral studs, a screw revolubly supported upon said cover and having portions oppositely threaded, gearing connecting said screw and said radial shaft, nuts engaging different portions of said screw, levers provided with fulcrums and pivotally attached to the end studs of said clutch and to said nuts, pivotal attachments between said clutch and said cover, a revoluble driving-cylinder constructed and arranged to be engaged by said ring-clutch and having an enlarged portion provided with an interior annular rack, a pinion fixed upon the non-revoluble shaft, and a revoluble cylinder constructed and arranged to be engaged by said clutch and having a face-plate provided with gearing capable of meshing with said annular rack and fixed pinion, substantially as set forth.

6. In a device for varying the speed of velocipedes, the combination of a hub, a shaft supported by and journaled radially at one end of the hub, a plate fixed upon one extremity of said shaft, a flanged sleeve adapted to encompass the shaft and having a longitudinal slot, a pin fixed upon the shaft and capable of engaging said slot in the sleeve, a wheel having a peripheral engaging-surface and a central orifice movably fitting the said shaft, the sides of said wheel constructed and arranged for frictional engagement with the flange of the said sleeve and the said plate, a spring adapted to be connected with said shaft and sleeve whereby pressure may be maintained upon the sides of the wheel thus limiting the amount of rotative force reaching the shaft by way of said wheel, substantially as set forth.

7. In a variable-speed gearing for velocipedes, the sprocket-wheel, 26, provided with a set-screw, in combination with the serrated, adjustable ring, 39, the hub, 34, attached to the cap, 40, the ring-clutch, 42, cone, 29, piece, 27, cylinder, 24, provided with the annular gear, 25, collar, 20, cone, 19, piece, 10, cylinder, 8, face-plate, 9, cone, 11, gears, 12, stationary pinion, 2, upon the axle, 3, the cap, 101, packing and attachments for rendering the whole dust-proof and oil-tight, the said parts being mutually adjustable and suitably kept in their proper positions, all substantially as and for the purposes shown and described.

8. In a variable-speed gearing for velocipedes, the combination of the hand-lever, 99, rod, 100, rhomboidal washer, 97, spring, 98, bell-crank, 91, rod, 88, adjustable in length, pivot, 87, arm, 86, pin, 85, screws, 84, parts, 83 and 82, of the bowl-shaped casing, movable sleeve, 80, having the helical thread, 81, arm, 78, having the orifice, 79, stationary sleeve, 75, friction-ring, 74, friction-wheel, 71, pin, 73, spring, 72, solid spindle, 70, having disk-head, 69, hollow spindle, 66, having disk-head, 68, pinion, 65, gear, 64, the screw, 58, suitably journaled and provided with the traveling nuts 56 and 57, the levers, 50 and 51, joined pivotally to the said nuts and the two end studs of the ring-clutch, the said levers having their fulcrums linked together, the ring-clutch, 42, the cap, 40, having slots for the passage of the ring-clutch studs and being attached pivotally to one of the said studs, the serrated ring, 39, the hub, 34, attached to the said cap, 40, cone, 29, piece, 27, sprocket-wheel, 26, cylinder, 24, annular gear, 25, collar, 20, cone, 19, piece, 10, cylinder, 8, face-plate, 9, cone, 11, gears, 12, stationary pinion, 2, axle, 3, cap, 101, packing and attachments for rendering the whole dust-proof and oil-tight, the said hub and cylinders being revoluble upon antifriction-bearings, the said parts being mutually adjustable and suitably kept in their proper positions, all substantially as and for the purposes shown and described.

In testimony whereof I affix my signature in presence of two witnesses.

WILLIAM TRUAX HARDER.

Witnesses:
JNO. M. BENTZ,
GEORGE E. SHEAFER.